United States Patent
Kraml et al.

[11] Patent Number: 6,141,683
[45] Date of Patent: *Oct. 31, 2000

[54] METHOD FOR REMOTELY AND RELIABLY UPDATING OF THE SOFTWARE ON A COMPUTER WITH PROVISION FOR ROLL BACK

[75] Inventors: Mark Heinrich Kraml, Flanders, N.J.; Jane Mary Leonard, Naperville, Ill.; Harvey Rubin, Morristown, N.J.; Laurel Ann Salvador, Winfield, Ill.

[73] Assignee: Lucent Technologies, Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/016,574

[22] Filed: Jan. 30, 1998

[51] Int. Cl.$^7$ ............................ G06F 15/177; G06F 9/445
[52] U.S. Cl. ............................................. 709/220; 395/712
[58] Field of Search ..................................... 709/217, 220, 709/250; 395/712

[56] References Cited

U.S. PATENT DOCUMENTS

| | | | |
|---|---|---|---|
| 5,155,837 | 10/1992 | Liu et al. ................................. | 395/500 |
| 5,359,730 | 10/1994 | Marron ................................... | 395/650 |
| 5,481,714 | 1/1996 | Pipkin et al. ........................... | 395/700 |
| 5,555,418 | 9/1996 | Nilsson et al. ......................... | 395/700 |
| 5,625,804 | 4/1997 | Cooper et al. .......................... | 395/500 |
| 5,682,533 | 10/1997 | Siljestroemer ......................... | 395/616 |
| 5,764,992 | 6/1998 | Kullick et al. .......................... | 395/712 |
| 5,798,785 | 8/1998 | Hendricks et al. ......................... | 348/1 |
| 5,873,088 | 2/1999 | Hayashi et al. ......................... | 707/100 |
| 6,031,830 | 2/2000 | Cowan ................................... | 370/338 |
| 6,070,012 | 5/2000 | Eitner ..................................... | 395/712 |

*Primary Examiner*—Zarni Maung
*Assistant Examiner*—Andrew Caldwell
*Attorney, Agent, or Firm*—DeMont & Breyer, LLC; Jason Paul DeMont; Wayne S. Breyer

[57] ABSTRACT

A technique for updating the software in a remote computer (e.g., a base station, a spacecraft in space, an electronic postage meter in an office, a medical monitoring device in a patient's home, etc.) from a central control (e.g., a wireless switching center, the National Aeronautics and Space Administration's Houston Control, a postage meter facility, a medical equipment manufacturer's factory, etc.) is disclosed. An illustrative embodiment of the present invention comprises: checking the integrity of a first software application at a first location in a first memory that is pointed to by a first address in a pointer; copying the first software application from the first memory to the second memory and executing the first software application from the second memory, when the integrity of the first software application is nominal; transmitting a first message indicating that the integrity of the first software application is not nominal, when the integrity of the first software application is not nominal; and receiving a first command to store a second address in the pointer, in response to the first message.

18 Claims, 3 Drawing Sheets

100

METHOD FOR REMOTELY AND RELIABLY UPDATING OF THE SOFTWARE ON A COMPUTER WITH PROVISION FOR ROLL BACK

FIELD OF THE INVENTION

The present invention relates to telecommunications in general, and, more particularly, to a method and apparatus for remotely installing software in a base station in a wireless telecommunications system.

BACKGROUND OF THE INVENTION

FIG. 1 depicts a schematic diagram of a portion of a typical wireless telecommunications system in the prior art, which system provides wireless telecommunications service to a number of wireless terminals (e.g., wireless terminals 101-1 through 101-3) that are situated within a geographic region. The heart of a typical wireless telecommunications system is Wireless Switching Center ("WSC") 120, which may also be known as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to local and long-distance telephone and data networks (e.g., local-office 130, local-office 139 and toll-office 140). Wireless Switching Center 120 is responsible for, among other things, establishing and maintaining calls between wireless terminals and between a wireless terminal and a wireline terminal, which is connected to the system via the local and/or long-distance networks.

The geographic area serviced by a wireless telecommunications system is partitioned into a number of spatially distinct areas called "cells." As depicted in FIG. 1, each cell is schematically represented by a hexagon; in practice, however, each cell usually has an irregular shape that depends on the topography of the terrain serviced by the system. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120. Upon receipt of the information, and with the knowledge that it is intended for wireless terminal 101-2, Wireless Switching Center 120 then returns the information back to base station 103-1, which relays the information, via radio, to wireless terminal 101-2.

A software application at each base station controls, among other things, the task of regulating the flow of information within that cell. As is well-known in the prior art, the software application can be complex and can require periodic or sporadic updates either to replace a corrupt software application or to provide an enhanced software application.

For example, the software application controlling a base station might comprise an error caused by a mistake in the logic in designing the software application, or an error caused by the corruption of one or more bits constituting the copy of the software application stored at the base station. The latter error can be caused by, for example, lightning, electrical surges on the power supply, solar flares, etc. Alternatively, the software application in the base station might need to be updated because a new version of software application has been developed that adds a new feature to the base station.

In either case, the new software application must be installed at the base station: (1) while the base station is performing its desired functionality, and (2) in a reliable manner. For example, a base station provides telecommunications services to customers 24 hours per day, and often, as in the case of 911 calls, the urgency of the calls is such that the base station should not be removed from service while the new software application is installed. Furthermore, the installation of the new software application and the design of the base station must be such that if there are any problems with the new software application, the base station is robust and able to recover while minimizing any disruption in service to customers.

A first method in the prior art for installing a software application in a base station is for the technician to physically transport the medium (e.g., a diskette, a CD-ROM, etc.) embodying the software application to the base station and to manually install the new software application into the base station. A wireless telecommunications system can comprises thousands of base stations that are dispersed over a vast geographic region and, therefore, it can be prohibitively slow or expensive or both to dispatch a technician to each base station. Although this method for installation can be performed while the base station is running, assuming that the base station has appropriate multitasking software, the reliability of this method is not clear. For example, if the newly installed software application crashes while the technician is at the base station, the technician can quickly re-install the software application. In contrast, if the new software application crashes after the technician has left the base station, service at the base station could be disrupted for a considerable period until the technician is able to return to the base station.

A second method in the prior art involves utilizing the communications channel between the wireless switching center and the base station to transport the software application. First the new software application is stored on a computer at the wireless switching center and a technician is dispatched to each base station, in turn. In accordance with this method, the technician does not transport a medium embodying the software application. The technician does, however, manually enter commands into the base station's console directing the base station to retrieve the software application from the wireless switching center and to store it into the base station's memory. After the software application is stored, the technician directs the base station to begin executing it. If the application fails while the technician is at the base station, the technician can re-install the software application, or, if the technician suspects a programming error, the technician can direct the base station to retrieve a prior, previously-tested software application from the wireless switching center and to store it into the base station's memory.

The second method is advantageous in that it allows a software application to be installed at the base station that is very recently created, and might not have been available to the technician when th, technician was last at his or her service facility. Furthermore, this method is advantageous because it enables the technician to have access to several versions of the software application, in case one version does not work. The second method is disadvantageous, however, because, like the first prior art method, it is slow, expensive, and offer's no more reliability than the first prior art method.

A third method in the prior art involves remotely directing the base station from the wireless switching center to install and execute a software application. This method is advantageous in that it eliminates the delay and expense of dispatching a technician to the base station, and allows very-recently developed software to be installed at the base station. This method is disadvantageous, however, in that if the software application crashes, the base station can be out of service while the software application is being re-installed. And because the software application can comprise megabytes of data, re-installation can take several minutes.

Therefore, the need exists for a technique for installing a software application at a base station reliably, inexpensively, and while the base station is performing its intended functionality.

SUMMARY OF THE INVENTION

Some embodiments of the present invention are capable of installing a new version of a software application in a remote computer (e.g., a base station, a spacecraft in space, an electronic postage meter in an office, a medical monitoring device in a patient's home, etc.) from a central control (e.g., a wireless switching center, the National Aeronautics and Space Administration's Houston Control, a postage meter facility, a medical equipment manufacturer's factory, etc.) with fewer costs and disadvantages than techniques in the prior art. In particular, some embodiments of the present invention are capable of installing a new version of a software application in a remote computer while the remote computer is executing an older version of the software application and in such a manner that if the new version of the software application is or becomes unusable for any reason, the remote computer can quickly "roll-back" to the older version (i.e., execute the older version instead of the newer version).

For example, consider a base station that is running an old version of a software application and that can have its functionality improved by a new version of the software application. Because the owner of a base station only earns revenue while the base station is operating, and because a base station provides essential public services (e.g., "911" service, etc.), it is detrimental to remove a base station from service to install the new version of the software application. Rather, it would be advantageous if the new version of the software application could be installed in the base station while the base station is operating—and, furthermore, while the base station is executing the older version of the software application.

In some embodiments of the present invention, the new version of the software application is installed into the base station's memory without overwriting the old version of the software application. If the new version of the software application crashes, or otherwise becomes unusable, then the base station can begin using the old version of the software application immediately because it is already stored in the base station. In otherwords, if the new version of the software application crashes or is otherwise unusable, the base station need not suspend operation while the new version of the software application is being retransmitted and re-installed—the base station can operate, albeit possibly with diminished functionality, using the old version of the software application until the new version has been re-installed in the base station.

An illustrative embodiment of the present invention comprises: checking the integrity of a first software application at a first location in a first memory that is pointed to by a first address in a pointer; copying the first software application from the first memory to the second memory and executing the first software application from the second memory, when the integrity of the first software application is nominal; transmitting a first message indicating that the integrity of the first software application is not nominal, when the integrity of the first software application is not nominal; and receiving a first command to store a second address in the pointer, in response to the first message.

DETAILED DESCRIPTION

Figure 1:
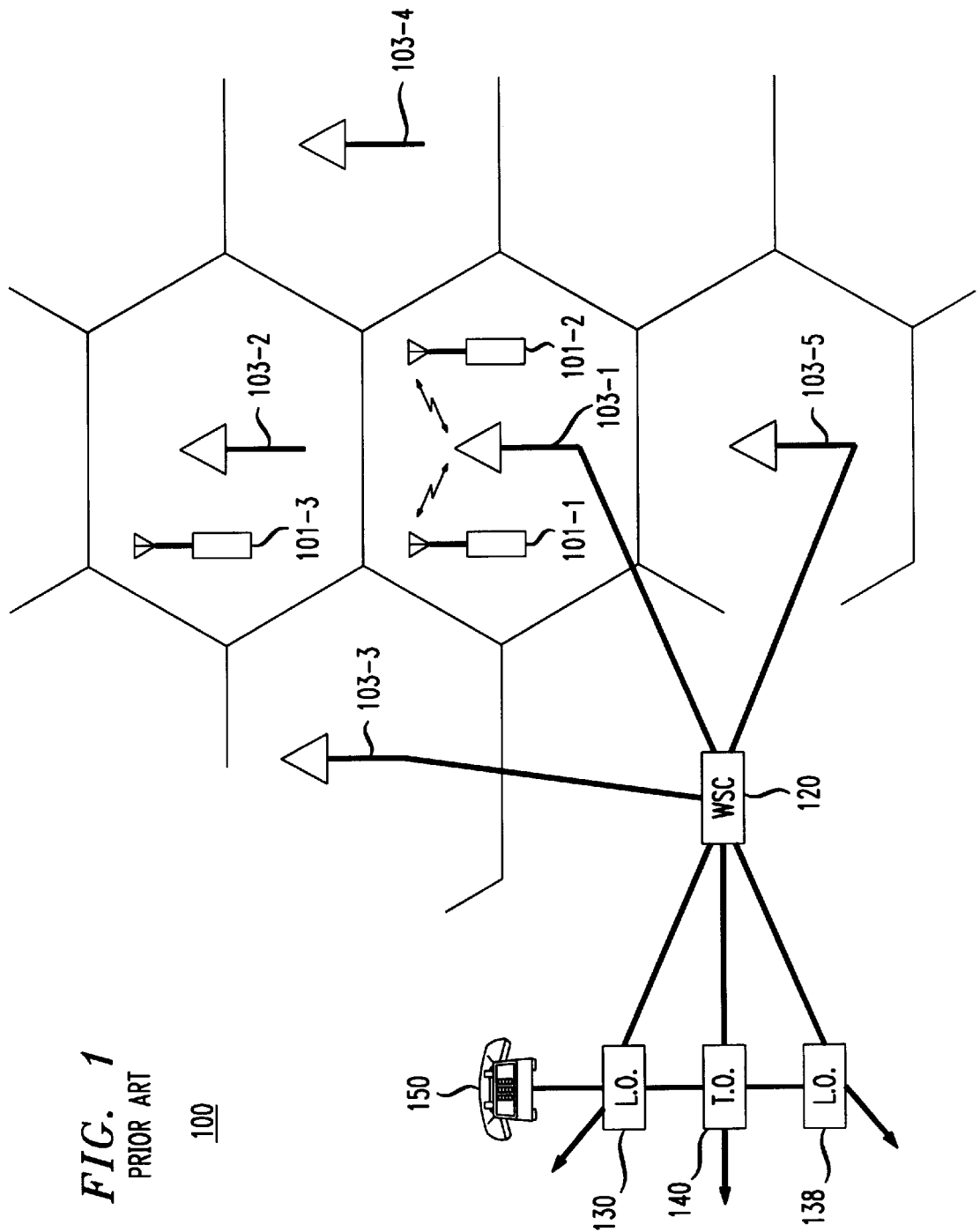
FIG. 1 depicts a schematic diagram of a wireless telecommunications in the prior art.
Figure 2:
FIG. 2 depicts a block diagram of the illustrative embodiment of the present invention.

FIG. 2 depicts a block diagram of an illustrative embodiment of the present invention, which enables a command center to control, monitor, program and re-program a remote computer, which can be separated from the command center by a vast distance.

The illustrative embodiment depicted in FIG. 2 advantageously comprises: control center 210, communications channel 220 and remote computer 230. Control center 210 is advantageously a facility (e.g., a wireless switching center, the National Aeronautics and Space Administration's Houston Control, a postage meter facility, a medical equipment manufacturer's factory, an automobile manufacturer, etc.) that is capable of controlling, monitoring, programming and re-programming remote computer 230 (e.g., a wireless base station, a spacecraft in space, a postage meter in an office, a medical monitor in a person's home, an automobile, etc.) via communications channel 220. Communications channel 220 can be a wireless or wireline connection, in well-known fashion, which communicatively connects remote computer 230 to control center 210. Control center 210 advantageously comprises all of the equipment that is capable of receiving messages from remote computer 230 and transmitting commands and files to remote computer 230. It will be clear to those skilled in the art how to make and use control center 210 and communications channel 220.

Figure 3:
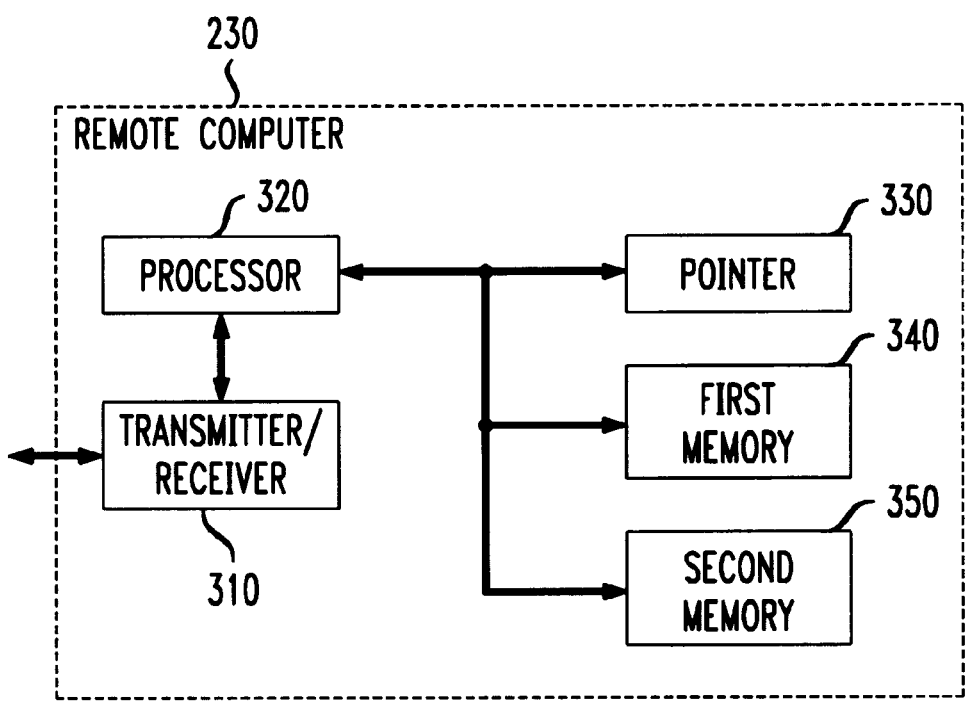
FIG. 3 depicts a block diagram of the salient components of the remote computer depicted in FIG. 2.

FIG. 3 depicts a block diagram of the salient components of remote computer 230, which advantageously comprises: transmitter/receiver 310, processor 320, pointer 330, first memory 340, and second memory 350, interconnected as shown. Transmitter/receiver 310 is advantageously capable of receiving commands and data from control center 210 and of transmitting messages and data to control center 210, in well-known fashion via either a wireless or wireline channel. Processor 320 is advantageously an appropriately-programmed general-purpose processor or a hard-wired special-purpose processor that is capable of interfacing with transmitter/receiver 310, pointer 330, first memory 340 and alterable memory 350, in well-known fashion.

Pointer 330 is advantageously a location in a non-volatile memory or a register or an entry in a directory, which contains the address (e.g., a file descriptor for a flat or hierarchical file system, a binary address, etc.) of a location in first memory 340, in well-known fashion.

First memory 340 is advantageously a non-volatile memory (e.g., a flash memory, etc.), which contains a thoroughly-tested bootstrapping program (e.g., an operating system, a monitor, etc.) that is automatically executed when remote computer 230 undergoes a cold re-boot. First memory 340 also advantageously contains at least a new version of the desired software application and at least one older version of the software application.

Although only the new version of the software application is necessary for execution, first memory 340 advantageously holds an older version of the software application for the same reason that an automobile carries a spare tire. Although a spare tire is typically an identical replacement for a punctured tire, the older version of the software application is, in contrast, typically not a identical replacement for the newer version of the software application. Typically, the newer version provides more functionality than the older version, but the older version, while less advantageous in terms of functionality, provides some functionality until the newer version can be fixed and re-installed in remote computer 230.

Therefore, remote computer 230 advantageously uses the newer version of the software application, when and if possible, and uses the older version of the software application if the newer version is or becomes unusable for any reason.

Second memory 350 is advantageously a volatile memory (e.g., high-speed SRAM, etc.) that is of sufficient capacity to store any one version of the software application. Advantageously, processor 320 can read from and write to second memory 350 more quickly than processor 320 can read from and write to first memory 340. In other words, first memory 340 is used to store several versions of the software application before they are copied into second memory 350 for execution. Second memory 350 and first memory 340 are advantageously, but not necessarily, in the same address space.

Figure 4:
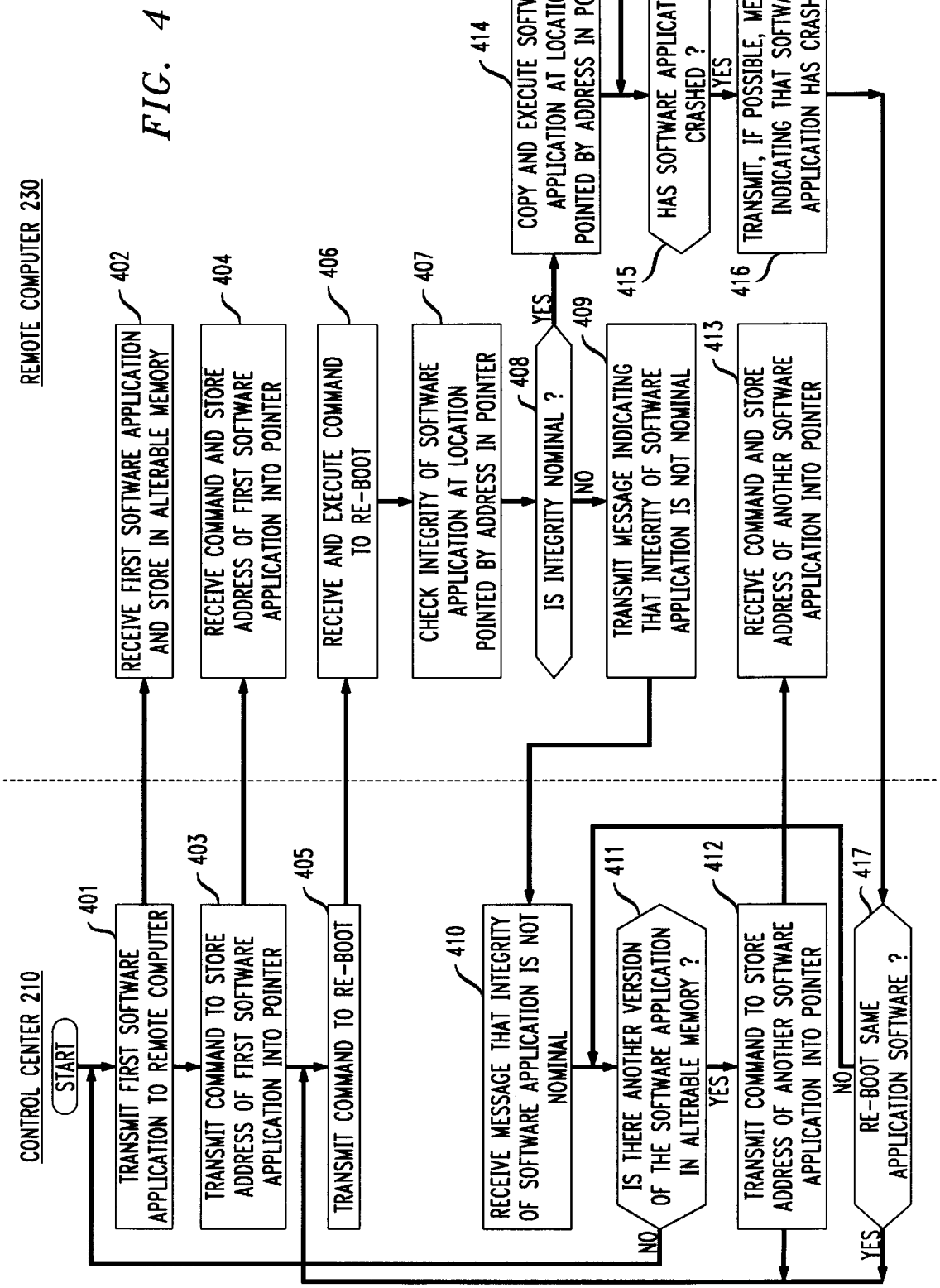
FIG. 4 depicts a flowchart of the steps performed by the illustrative embodiment of the present invention.

FIG. 4 depicts a flowchart of the salient steps performed by the illustrative embodiment of the present invention. The operation of the illustrative embodiment is recursive and, therefore, references to particular versions of the software application can be articulated only in relative, in contrast to absolute, terms.

When the flowchart in FIG. 4 begins, remote computer 230 is presumed to be operating normally and executing version "n" of the software application from second memory 350. Furthermore, version n (the newer version) and version n−1 (the older version) of the software application are both stored in first memory 340.

At step 401, control center 210 advantageously transmits the newest version of the software application, version n+1, to remote computer 230, in well-known fashion via communications channel 220.

At step 402, remote computer 230, under the control of version n, stores version n+1 into first memory 340, in well-known fashion. In some embodiments of the present invention, control center 210 can direct the exact location in second memory 350 into which the version n+1 is stored, or, alternatively, control center 210 can allow remote computer 230 to decide the location. When remote computer 230 decides the location, that location is advantageously stored in a non-volatile memory or is transmitted to control center 210 or both.

Advantageously, all versions of the software application are capable of multi-tasking. In particular, version n is advantageously capable of performing its desired functionality (i.e., the functionality for which it was designed and built) and of receiving and storing version n+1 of the software application into an unused portion of first memory 340.

At step 403, control center 210 transmits a command to remote computer 230 directing remote computer 230 to store into pointer 330 the address of the location in first memory 340 where version n+1 is stored. It is not necessary that control center 210 knows the address of the location where the first software application is stored as long as remote computer 230 knows the address and is capable of executing the command. In general, however, it is advantageous that either control center 210 or remote computer 230 or both know the address.

At step 404, remote computer 230, under the control of version n, stores the address of version n+1 into pointer 330, in well-known fashion. At this point, remote computer 230 contains copies of at least three versions of the software application: version n−1 (the oldest), version n (the one currently running), and version n+1 (the newest).

At step 405, control center 210 transmits a command to remote computer 230 directing processor 320 to re-boot, in well-known fashion.

At step 406, remote computer 230 begins the process of re-booting, in well known fashion, which advantageously comprises executing the bootstrapping program in first memory 340.

At step 407, processor 320, under the control of the bootstrapping program, checks the integrity of whatever version of the software application is currently pointed to by the address contained in pointer 330. The integrity of the software application can be checked, for example, by computing the Cyclic Redundancy Checksum ("CRC") code of the software application against a stored checksum, in well-known fashion. It will be clear to those skilled in the art how to check the integrity of a program, file or other string of symbols.

At step 408, remote computer 230, under the control of the bootstrapping program, makes the decision to follow one of two courses of action. When the integrity of the checked version is nominal, then control passes to step 414. For the purposes of this specification, the term "nominal" means that the bits constituting that version of the software application are not corrupted. When the integrity of the checked version is not nominal, then control passes to step 409.

At step 409, remote computer 230, under the control of the bootstrapping program, advantageously transmits a message to control center 210 indicating that the integrity of the checked version is not nominal.

At step 410, control center 210 receives the message from remote computer 230 indicating that the integrity of the checked version is not nominal.

At step 411, control center 210 determines whether version n remains in first memory 340. When it does, control passes to step 412; otherwise control passes to step 401.

At step 412, control center 210 transmits a command to remote computer 230 directing remote computer 230 to store the address of the location of version n into pointer 330. From step 412, control passes to step 405.

At step 413, remote computer 230, under control of the bootstrapping program, receives and executes the command to store the address of the location of version n into pointer 330. It is not necessary that control center 210 knows the address of the location where version n is stored as long as remote computer 230 knows the address and is capable of executing the command. In general, however, it is advantageous that either control center 210 or remote computer 230 or both know the address.

At step 414, remote computer 230, under control of the bootstrapping program, copies the software application at the location in first memory 340 pointed to by the address contained in pointer 330 (ie., version n+1) into second memory 350, and begins execution of version n+1 from second memory 350.

At step 415, remote computer 230 determines, if possible, if version n+1 has crashed. When version n+1 has not crashed, control remains at step 415. When version n+1 has crashed, then control passes to step 416. While remote computer 230 is executing version n+1, it is advantageously transmitting telemetry data to command center 210 regarding the status of remote computer 230.

At step 416, remote computer 230 transmits a message, if possible, to control center 210 indicating that version n+1 has crashed. When remote computer 230 is unable to transmit a message indicating that version n+1 has crashed, perhaps because the crash has corrupted and frozen remote computer 230, control center 210 is advantageously capable of inferring the crash from changes in telemetry data from remote computer 210.

At step 417, control center 210 advantageously receives the message indicating that version n+1 has crashed and decides if version n+1 should be re-booted, or, alternatively, if a roll-back to version n should be initiated. The functionality afforded by step 417 is advantageous because it enables control center 210 to try version n+1 several times to be convinced that it is flawed before initiating the roll-back to version n. If control center 210 desires to re-boot version n+1, control passes to step 405; alternatively, control passes to step 411. Alternatively, if control center 210 infers from changes in telemetry data that remote computer 230 has crashed, then control center 210 spontaneously passes control to step 405. The illustrative embodiment continues the process of rolling back to earlier versions (e.g., version n−1, version n−2, etc.) until a version is located whose integrity is nominal and until the newest version (e.g., version n+1, version n+2, etc.) can be installed, or re-installed, and executed by remote computer 230.

The technique depicted in FIG. 4 is recursive, and advantageously: (1) enables the software in remote computer 230 to be updated while remote computer 230 is operating, (2) is reliable in that it enables remote computer 230 to roll-back to previous versions of the software application, if they exist, while reducing any disruption in the provisioning of service, and (3) is inexpensive.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:
checking the integrity of a first software application at a first location in a first memory that is pointed to by a first address in a pointer;
copying, after said checking the integrity of said first software application, said first software application from said first memory to said second memory and executing said first software application from said second memory when the integrity of said first software application is nominal;
transmitting a first message indicating that the integrity of said first software application is not nominal, when the integrity of said first software application is not nominal; and
receiving a first command to store a second address in said pointer, in response to said first message.

2. The method of claim 1 further comprising checking the integrity of a second software application at a second location in said first memory that is pointed to by said second address.

3. The method of claim 2 further comprising:
executing said second software application, when the integrity of said second software application is nominal; and
transmitting a second message indicating that the integrity of said second software application is not nominal, when the integrity of said second software application is not nominal.

4. The method of claim 3 further comprising:
receiving a copy of said first software application, in response to said second message; and
storing said copy of said first software application at a third location in said first memory.

5. The method of claim 4 wherein said first location equals said third location.

6. The method of claim 3 further comprising:
receiving a second command to store a third address in said pointer;
checking the integrity of said copy of said first software application in said first memory, which is pointed to by said third address in said pointer;
copying copy of said first software application from said first memory to said second memory arid executing said copy of said first software application from said second memory, when the integrity of said first software application is nominal; and
transmitting a third message indicating that the integrity of said copy of said first software application is not nominal, when the integrity of said copy of said first software application is not nominal.

7. An apparatus comprising:
a processor for checking the integrity of a first software application at a first location in a first memory that is pointed to by a first address in a pointer, and for copying, after said checking the integrity of said first software application, said first software application from said first memory to a second memory and executing said first software application from said second memory when the integrity of said first software application is nominal;
a transmitter for transmitting a first message indicating that the integrity of said first software application is not nominal, when the integrity of said first software application is not nominal; and
a receiver for receiving a first command to store a second address in said pointer, in response to said first message.

8. The apparatus of claim 7 wherein said processor checks the integrity of a second software application in said first memory that is pointed to by a second address in said pointer.

9. The apparatus of claim 8 wherein said processor executes said second software application, when the integrity of said second software application is nominal; and said transmitter transmits a second message indicating that the integrity of said second software application is not nominal, when the integrity of said second software application is not nominal.

10. The apparatus of claim 8 wherein said receiver receives a copy of said first software application, in response to said second message; and said processor stores said copy of said first software application at a third location in said first memory.

11. The apparatus of claim 10 wherein said first location equals said third location.

12. The apparatus of claim 10 wherein:

said processor receives a second command to store said third address in said pointer, and checks the integrity of said copy of said first software application in said first memory that is pointed to by said third address in said pointer, and executes said copy of said first software application, when the integrity of said copy of said first software application is nominal; and said transmitter transmits a third message indicating that the integrity of said copy of said first software application is not nominal, when the integrity of said copy of said first software application is not nominal.

13. A method comprising:

transmitting a first software application to a remote computer for storage in a first location in a first memory that is pointed to by a first address;

transmitting a first command to said remote computer directing said remote computer to store said first address in a pointer;

receiving a first message from said remote computer indicating that the integrity of said first software application in said first memory is not nominal; and transmitting a second command to said remote computer directing said remote computer to store a second address, which points to a second software application in a second location in said first memory, in said pointer, in response to said first message.

14. The method of claim 13 further comprising:

receiving a second message from said remote computer indicating that the integrity of said second software application in said first memory is not nominal;

transmitting a copy of said first software application to said remote computer for storage in a third location in said first memory that is pointed to by a third address; and transmitting a third command to said remote computer directing said remote computer to store said third address in said pointer.

15. The method of claim 14 wherein said first location equals said third location.

16. A wireless switching center comprising:

means for transmitting a first software application to a remote computer for storage in a first location in a first memory that is pointed to by a first address;

means for transmitting a first command to said remote computer directing said remote computer to store said first address in a pointer;

means for receiving a first message from said remote computer indicating that the integrity of said first software application in said first memory is not nominal; and means for transmitting a second command to said remote computer directing said remote computer to store a second address, which points to a second software application in a second location in said first memory, in said pointer, in response to said first message.

17. The wireless switching center of claim 16 further comprising:

means for receiving a second message from said remote computer indicating that the integrity of said second software application in said first memory is not nominal;

means for transmitting a copy of said first software application to said remote computer for storage in a third location in said first memory that is pointed to by a third address; and means for transmitting a third command to said remote computer directing said remote computer to store said third address in said pointer.

18. The wireless switching center of claim 17 wherein said first location equals said third location.

* * * * *